United States Patent
Song et al.

(10) Patent No.: US 11,699,958 B2
(45) Date of Patent: Jul. 11, 2023

(54) VOLTAGE SWITCHING CIRCUIT AND POWER ADAPTER HAVING REGULATED RANGE OF OUTPUT VOLTAGE

(71) Applicant: Delta Electronics (Shanghai) Co., Ltd., Shanghai (CN)

(72) Inventors: Haibin Song, Shanghai (CN); Jian Zhou, Shanghai (CN); Hairui Xu, Shanghai (CN); Daofei Xu, Shanghai (CN); Jinfa Zhang, Shanghai (CN)

(73) Assignee: DELTA ELECTRONICS (SHANGHAI) CO., LTD., Shanghai (CN)

(*) Notice: Subject to any disclaimer, the term of this patent is extended or adjusted under 35 U.S.C. 154(b) by 42 days.

(21) Appl. No.: 17/365,992

(22) Filed: Jul. 1, 2021

(65) Prior Publication Data
US 2022/0006389 A1    Jan. 6, 2022

(30) Foreign Application Priority Data
Jul. 6, 2020    (CN) .......................... 202010642356.0

(51) Int. Cl.
*H02M 3/335* (2006.01)
*H02M 1/00* (2006.01)
*H02M 1/32* (2007.01)

(52) U.S. Cl.
CPC ....... *H02M 3/33576* (2013.01); *H02M 1/009* (2021.05); *H02M 1/0048* (2021.05);
(Continued)

(58) Field of Classification Search
CPC .. H02M 1/009; H02M 1/0083; H02M 1/0067; H02M 1/0048; H02M 1/32;
(Continued)

(56) References Cited

U.S. PATENT DOCUMENTS

| 10,819,143 B1* | 10/2020 | Hsiang ................. H02H 3/385 |
| 2015/0229149 A1* | 8/2015 | Fahlenkamp ..... H02M 3/33523 320/114 |

(Continued)

FOREIGN PATENT DOCUMENTS

| CN | 101399493 A | * | 4/2009 |
| CN | 106602699 A |   | 4/2017 |

(Continued)

*Primary Examiner* — Kyle J Moody
*Assistant Examiner* — Jye-June Lee
(74) *Attorney, Agent, or Firm* — CKC & Partners Co., LLC

(57) ABSTRACT

Disclosed are a voltage switching circuit and a power adapter having the same. The voltage switching circuit comprises a first switching circuit having a first terminal receiving a first voltage from a first converter, and a second switching circuit having a first terminal receiving a second voltage from a second converter. Second terminals of the first and second switching circuits are electrically connected to form a switching terminal for outputting an output voltage. When the output voltage is required to be switched from the first voltage to the second voltage, the first switching circuit is controlled to be turned off and then the second switching circuit is controlled to be turned on, and when a voltage at the first terminal of the second switching circuit is higher than a preset voltage, the second converter is shut down or kept off.

23 Claims, 11 Drawing Sheets

(52) U.S. Cl.
CPC ....... *H02M 1/0067* (2021.05); *H02M 1/0083* (2021.05); *H02M 1/32* (2013.01)

(58) Field of Classification Search
CPC .... H02M 1/007; H02M 1/4208; H02M 1/348; H02M 3/285; H02M 3/33576; H02M 3/33507; H02M 3/33569; H02M 7/217; Y02B 70/10; Y02P 80/10
See application file for complete search history.

(56) References Cited

U.S. PATENT DOCUMENTS

| | | | | |
|---|---|---|---|---|
| 2020/0304029 | A1* | 9/2020 | Takahiro | ............. H02M 3/1584 |
| 2021/0313889 | A1* | 10/2021 | Zhou | ................... H02M 3/3353 |
| 2022/0262322 | A1* | 8/2022 | Pang | ...................... G09G 3/342 |

FOREIGN PATENT DOCUMENTS

| | | | | | |
|---|---|---|---|---|---|
| CN | 108173338 | A | | 6/2018 | |
| CN | 112332478 | A | * | 2/2021 | ............ H02J 7/0036 |
| CN | 113648046 | A | * | 11/2021 | |

* cited by examiner

VOLTAGE SWITCHING CIRCUIT AND POWER ADAPTER HAVING REGULATED RANGE OF OUTPUT VOLTAGE

CROSS-REFERENCE TO RELATED APPLICATIONS

This non-provisional application claims priority under 35 U.S.C. § 119(a) on Patent Application No. 202010642356.0 filed in P.R. China on Jul. 6, 2020, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to a field of power electronics, and particularly to a voltage switching circuit and a power adapter.

2. Related Art

Recently, USB PD type C techniques are developed rapidly with a higher percentage of market occupancy and a wider application range. Standard power range of USB PD type C is 100 W or less, and a extended power range up to 240 W is under development. Due to a current rating limitation of the USB type C connector, extended power range is generally achieved by increasing an output voltage. For example, if the maximum output power is 200 W and an output current is limited to 5 A, a range of the output voltage becomes 5V to 40V. Meanwhile, an efficiency under the respective output voltage should satisfy a relevant requirement for efficiency.

A conventional high power adapter generally uses an LLC converter to achieve high efficiency. However, the LLC converter has a weakness for regulating the output voltage and is not suitable for the USB PD type C.

The conventional high power adapter may also use a flyback converter. The flyback converter has a strong capability for regulating the output voltage, but has a lower efficiency than the LLC converter and thus cannot satisfy the requirement for a high power density. In addition, as a regulating range of the output voltage becomes wider, it is difficult to optimize an efficiency under each output voltage or to satisfy the requirement for efficiency under each output voltage. Likewise, a half-bridge converter may have the same issues.

Therefore, in application of the high-power USB PD type C, it is urgent to develop a novel power adapter and a novel voltage switching circuit which satisfy both requirements for the regulating range of the output voltage and the efficiency.

SUMMARY OF THE INVENTION

An object of the invention is to provide a novel power adapter and a novel voltage switching circuit, which can satisfy both requirements for the regulating range of the output voltage and the efficiency.

To achieve the above object, the invention provides a voltage switching circuit, comprising: a first switching circuit including a first switch and having a first terminal electrically connected to a first output terminal of a first converter and receiving a first voltage outputted from the first converter; and a second switching circuit including a second switch and having a first terminal electrically connected to a second output terminal of a second converter and receiving a second voltage outputted from the second converter, wherein a second terminal of the first switching circuit is electrically connected to a second terminal of the second switching circuit to form a switching terminal for outputting an output voltage, and wherein when the output voltage is required to be switched from the first voltage to the second voltage, the first switching circuit is controlled to be turned off, and then the second switching circuit is controlled to be turned on such that the output voltage is switched to the second voltage, and wherein when a voltage at the first terminal of the second switching circuit is higher than a preset voltage during switching, an operation of the second converter is shut down or kept off.

To achieve the above object, the invention further provides a power adapter, comprising: a power factor correction circuit comprising a bus capacitor; a first converter comprising an input electrically connected to the bus capacitor and a first output for outputting a first voltage; a second converter comprising an input electrically connected to the bus capacitor and a second output for outputting a second voltage; and a voltage switching circuit comprising: a first switching circuit including a first switch and having a first terminal for receiving the first voltage; and a second switching circuit including a second switch and having a first terminal for receiving the second voltage, wherein a second terminal of the first switching circuit is electrically connected to a second terminal of the second switching circuit to form a switching terminal for outputting an output voltage.

The present invention divides a range of the output voltage into a plurality of output voltages having different levels, such as a high voltage output portion and a low voltage output portion, through a combination of a plurality of converters, and meanwhile switches the operation state and operation mode of the plurality of converters through a voltage switching circuit, such that it is possible to satisfy both requirements for the regulating range of the output voltage and the efficiency.

The additional aspects and advantages of the invention are partially explained in the following description, and partially become apparent from the description or can be obtained through practice of the invention.

BRIEF DESCRIPTION OF THE DRAWINGS

The exemplary embodiments will be described in detail with reference to the accompanying drawings, through which the above and other features and advantages of the invention will become more apparent.

DETAILED EMBODIMENTS OF THE INVENTION

Figure 1:
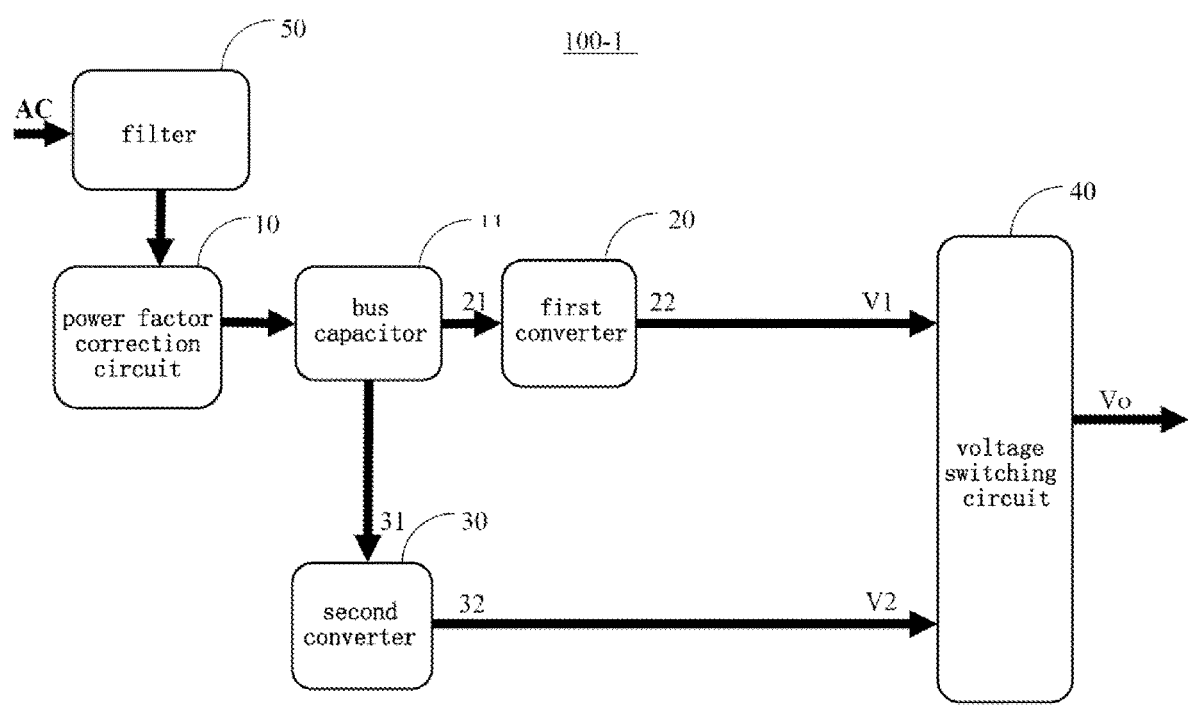
FIG. 1 is a diagram illustrating a power adapter according to a first embodiment of the invention.

The exemplary embodiments will now be described more fully with reference to the accompanying drawings. However, the exemplary embodiments can be implemented in various forms and should not be understood as being limited to the embodiments set forth herein; instead, these embodiments are provided so that this invention will be thorough and complete, and the conception of exemplary embodiments will be fully conveyed to those skilled in the art. In the drawings, the same reference sign denotes the same or similar element, so their detailed description will be omitted.

When elements/components/and the like described and/or illustrated herein are introduced, the phrases "a", "an", "the", "said" and "at least one" refer to one or more elements/components/and the like. The terms "include", "comprise" and "have" refer to an open meaning that other elements/components/and the like than the listed elements/components/and the like may exist. The relative phrases, such as, "upper" or "lower" may be used herein to describe a relative relation of one component over another component. It should be understood that if the illustrated device reverses upside down, a component described as being on an "upper" side will become a component on a "lower" side. In addition, the terms "first", "second" and the like in the claims are only used to distinguish the objects, instead of numeral limitations to the objects.

FIG. 1 illustrates a power adapter according to a first embodiment of the invention. As shown in FIG. 1, the power adapter 100-1 preferably comprises a power factor correction circuit 10, a first converter 20, a second converter 30 and a voltage switching circuit 40. The power factor correction circuit 10 is electrically connected to a bus capacitor 11 for receiving an AC (alternating current) voltage. An input 21 of the first converter 20 is electrically connected to the bus capacitor 11, and a first output 22 of the first converter 20 outputs a first voltage V1. An input 31 of the second converter 30 is electrically connected to the bus capacitor 11, and a second output 32 of the second converter 30 outputs a second voltage V2. The second voltage V2 may be different from the first voltage V1. For example, the voltage switching circuit 40 may be a voltage switching circuit 40 shown in FIG. 8.

Figure 8:
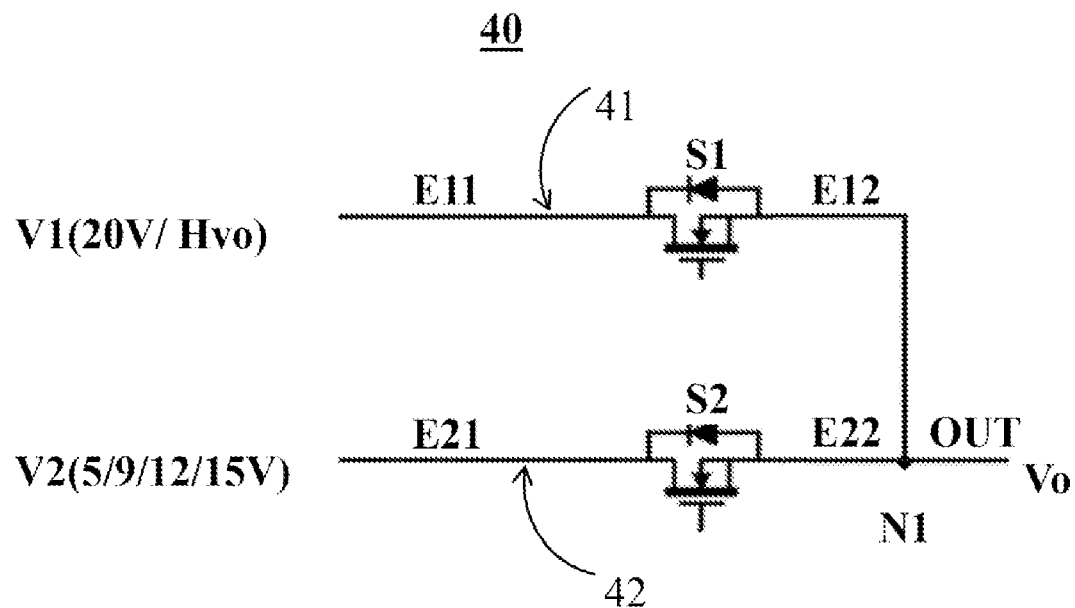
FIG. 8 is a diagram illustrating a voltage switching circuit in the power adapter according to the invention.

As shown in FIG. 8, the voltage switching circuit 40 comprises a first switching circuit 41 and a second switching circuit 42. A first terminal E11 of the first switching circuit 41 receives the first voltage V1, and the first switching circuit 41 includes a first switch S1. A first terminal E21 of the second switching circuit 42 receives the second voltage V2, and the second switching circuit 42 includes a second switch S2. A second terminal E12 of the first switching circuit 41 and a second terminal E22 of the second switching circuit 42 are electrically connected at a node N1 to form a switching terminal OUT for outputting an output voltage Vo. The output voltage Vo may be switched by the first switch S1 and the second switch S2.

The first switch S1 comprises a drain electrode serving as the first terminal E11 of the first switching circuit 41 and a source electrode serving as the second terminal E12 of the first switching circuit 41. The second switch S2 comprises a drain electrode serving as the first terminal E21 of the second switching circuit 42 and a source electrode serving as the second terminal E22 of the second switching circuit 42.

Figure 9:
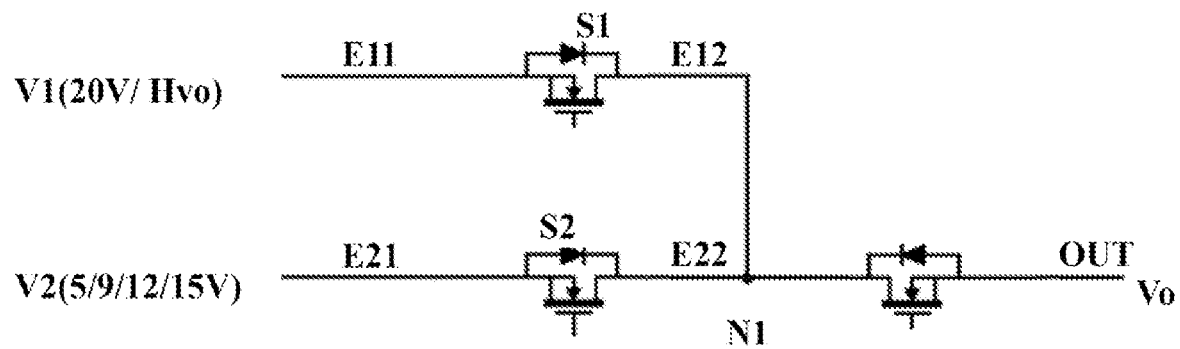
FIG. 9 is a diagram illustrating a voltage switching circuit in the power adapter according to a variation example of the invention.

In a variation example of the invention, as shown in FIG. 9, the first switch S1 comprises a source electrode serving as the first terminal E11 of the first switching circuit 41 and a drain electrode serving as the second terminal E12 of the first switching circuit 41. The second switch S2 comprises a source electrode serving as the first terminal E21 of the second switching circuit 42 and a drain electrode serving as the second terminal E22 of the second switching circuit 42. The voltage switching circuit 40 further comprise a third switch connected between the node N1, at which the first switch S1 and the second switch S2 are electrically connected to each other, and the switching terminal OUT.

In the invention, the power adapter 100-1 may further comprise a filter 50 electrically connected to the power factor correction circuit 10. The AC voltage may be received by the power factor correction circuit 10 after being EMI filtered by the filter 50.

In one embodiment, the first voltage V1 is higher than the second voltage V2. For example, in the embodiment of FIG. 1, the first voltage V1 may be, for example, 20V, 40V or a higher voltage Hvo, and the second voltage V2 may be, for example, 5V, 9V, 12V or 15V. Of course, it can be understood that the first voltage V1 and the second voltage V2 are not limited to the above values and may be set to other values as needed, but the invention is not limited thereto.

In the invention, the first switch S1 and the second switch S2 may be semiconductor switching elements, such as a PMOS (Positive channel Metal Oxide Semiconductor) or an NMOS (Negative channel Metal Oxide Semiconductor).

The present invention divides a range of the output voltage into a high voltage output portion and a low voltage output portion through a combination of the first converter 20 and the second converter 30, and meanwhile switches the operation state and operation mode of the first converter 20 and the second converter 30 cooperated with the voltage switching circuit 40, such that it is possible to satisfy both requirements for the regulating range of the output voltage and the efficiency.

Figure 2:
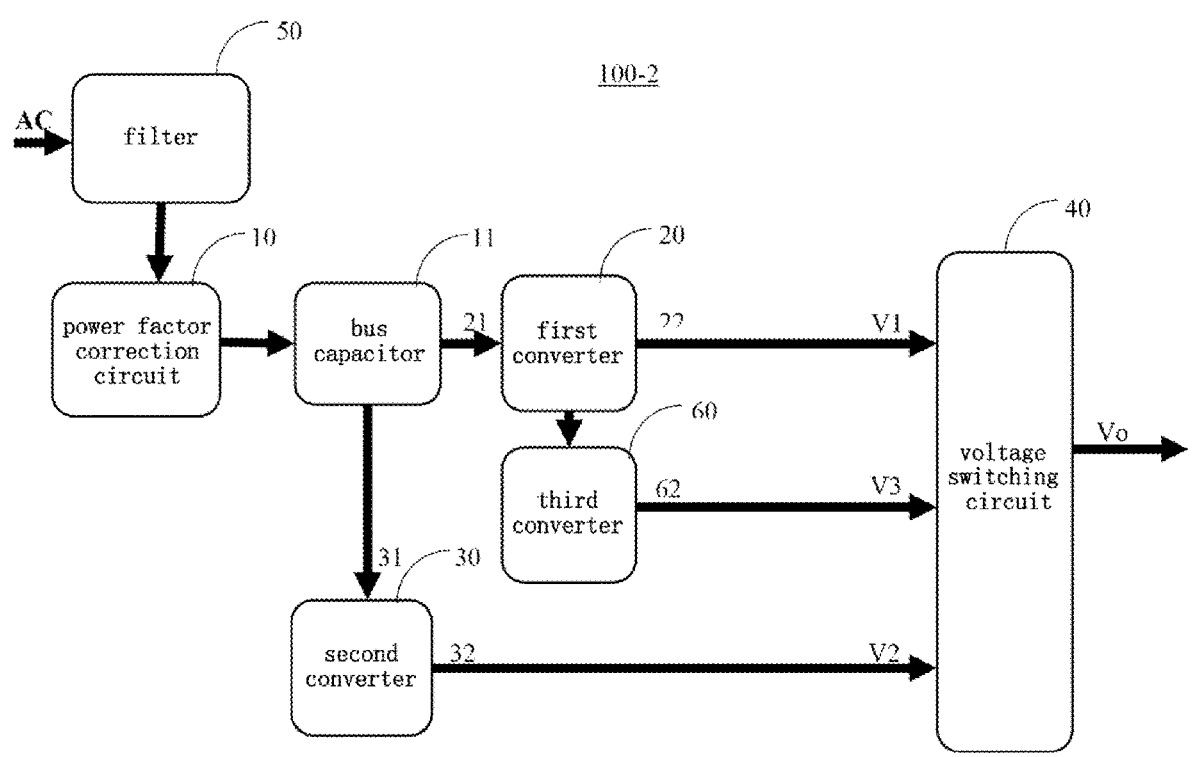
FIG. 2 is a diagram illustrating a power adapter according to a second embodiment of the invention.

FIG. 2 illustrates a power adapter according to a second embodiment of the invention. The power adapter 100-2 of FIG. 2 differs from the power adapter 100-1 of FIG. 1 in that the power adapter 100-2 further comprises a third converter 60 electrically connected to the first converter 20. The third converter 60 comprises a third output 62 for outputting a third voltage V3. Correspondingly, the voltage switching circuit 40 further comprises a third switching circuit (not shown) including a third switch, and having a first terminal for receiving the third voltage V3 and a second terminal electrically connected to the second terminal of the first switching circuit and the second terminal of the second switching circuit. In this embodiment, the first voltage V1 may be, for example, a higher voltage Hvo (e.g., 40V), the third voltage V3 may be, for example, 20V, and the second voltage V2 may be, for example, 5V, 9V, 12V or 15V.

Figure 3:
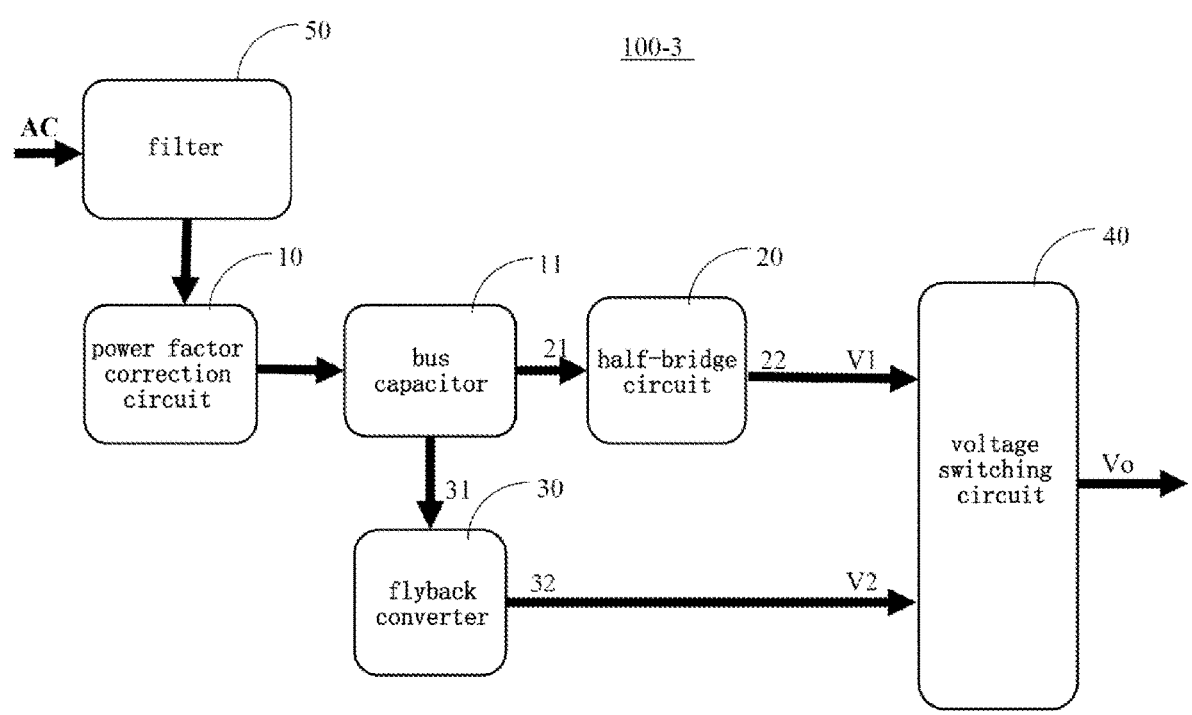
FIG. 3 is a diagram illustrating a power adapter according to a third embodiment of the invention.

FIG. 3 illustrates a power adapter according to a third embodiment of the invention. As shown in FIG. 3, the first converter 20 includes a half-bridge circuit, and the second converter 30 is a flyback converter. When the flyback converter operates, the power factor correction circuit 10 does not operate, and when the power factor correction circuit 10 operates, the flyback converter does not operate. In this embodiment, the first voltage V1 may be, for example, 20V, 40V or a higher voltage Hvo, and the second voltage V2 may be, for example, 5V, 9V, 12V or 15V.

Figure 4:
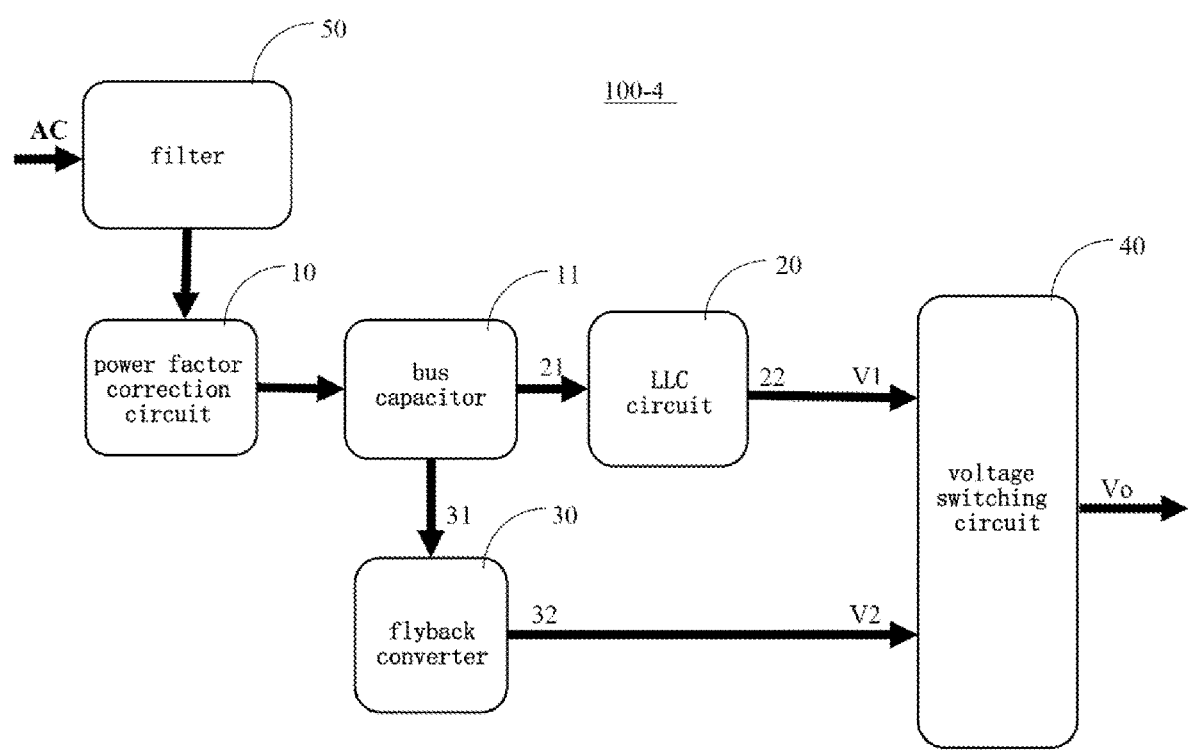
FIG. 4 is a diagram illustrating a power adapter according to a fourth embodiment of the invention.

FIG. 4 illustrates a power adapter according to a fourth embodiment of the invention. As shown in FIG. 4, the first converter 20 includes an LLC circuit, and the second converter 30 is a flyback converter. When the flyback converter (i.e., the second converter 30) operates, the power factor correction circuit 10 does not operate, and when the power factor correction circuit 10 operates, the flyback converter does not operate. In this embodiment, the first voltage V1 may be, for example, 20V, 40V or a higher voltage Hvo, and the second voltage V2 may be, for example, 5V, 9V, 12V or 15V.

Figure 5:
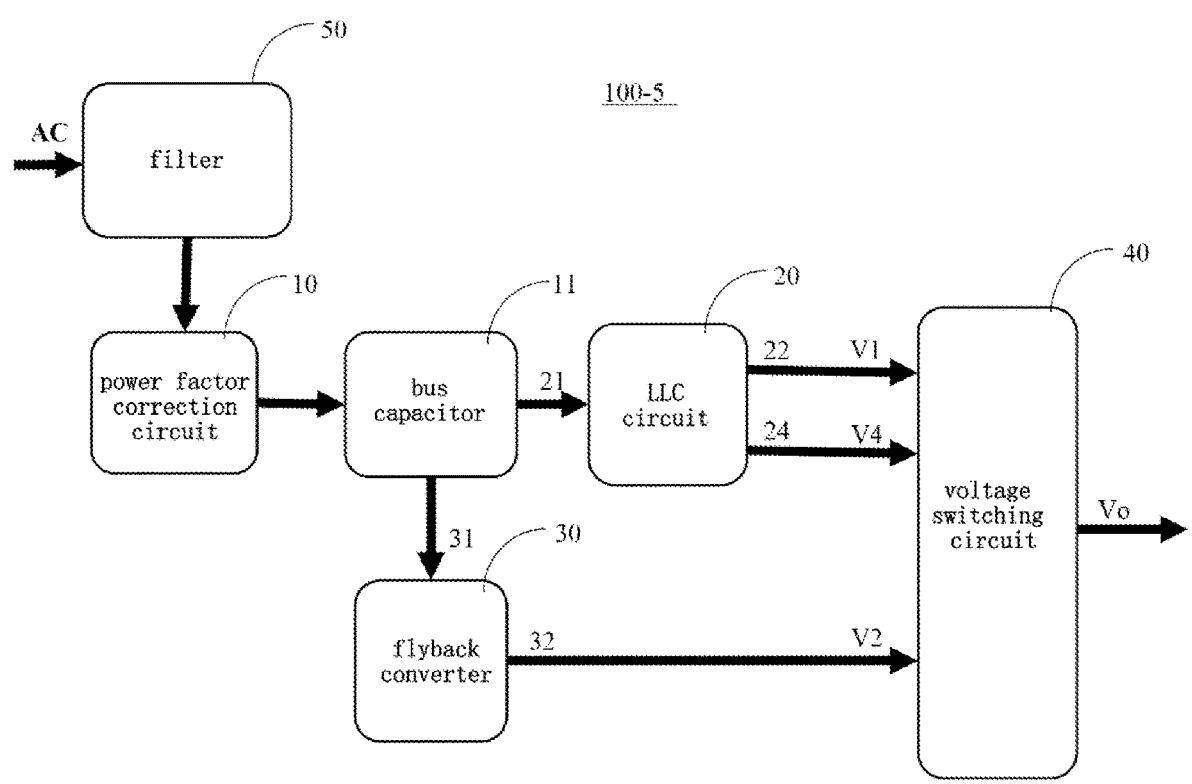
FIG. 5 is a diagram illustrating a power adapter according to a fifth embodiment of the invention.

FIG. 5 illustrates a power adapter according to a fifth embodiment of the invention. The power adapter 100-5 of FIG. 5 differs from the power adapter 100-4 of FIG. 4 in that the first converter 20 further comprises a fourth output 24 for outputting a fourth voltage V4. Correspondingly, the voltage switching circuit 40 further comprises a third switching circuit (not shown) including a third switch, and having a first terminal for receiving the fourth voltage V4 and a second terminal electrically connected to the second terminal of the first switching circuit and the second terminal of the second switching circuit. Moreover, when the flyback converter (i.e., the second converter 30) operates, the power factor correction circuit 10 does not operate, and when the power factor correction circuit 10 operates, the flyback converter does not operate. In this embodiment, the first voltage V1 may be, for example, 40V or a higher voltage Hvo, the third voltage V3 may be, for example, 20V, and the second voltage V2 may be, for example, 5V, 9V, 12V or 15V. In one embodiment, the LLC circuit includes a transformer having a secondary winding electrically connected to a half-wave rectifying circuit and a full-wave rectifying circuit, and the first output and the fourth output are electrically connected the half-wave rectifying circuit and the full-wave rectifying circuit, respectively (not shown).

Figure 6:
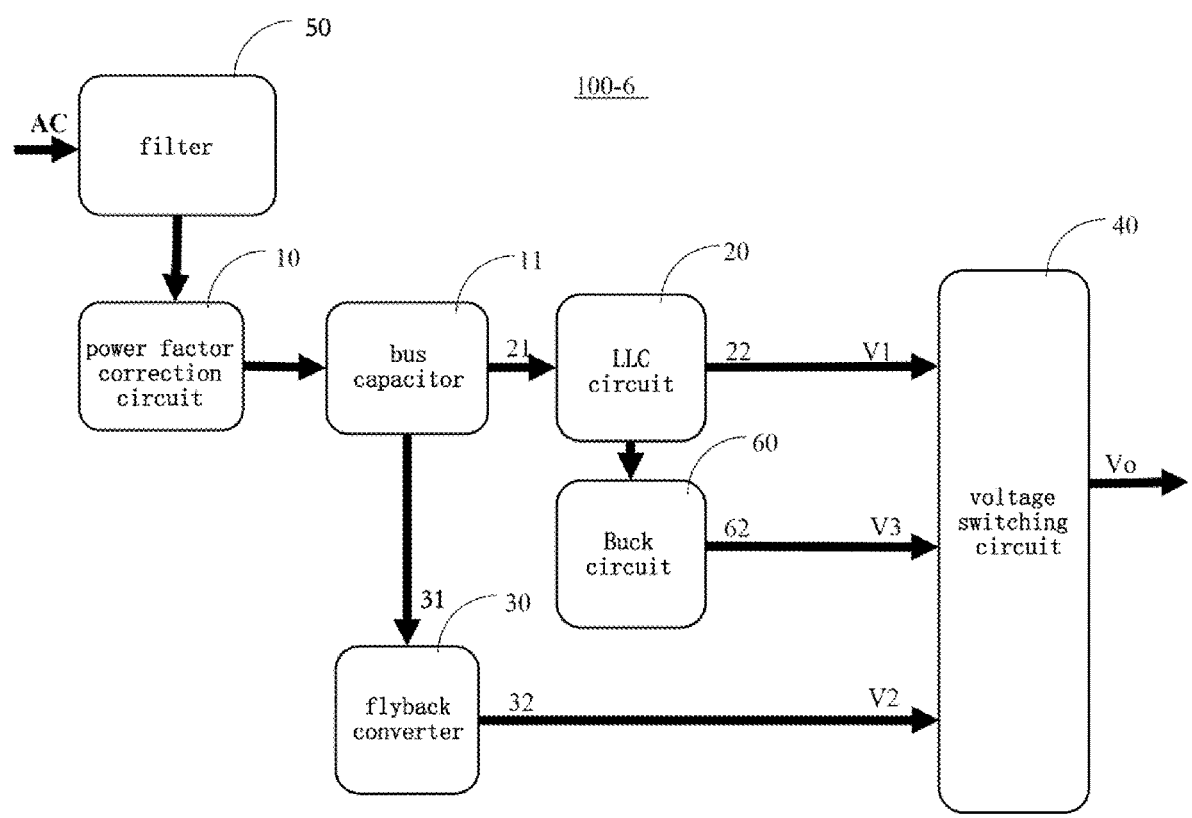
FIG. 6 is a diagram illustrating a power adapter according to a sixth embodiment of the invention.

FIG. 6 illustrates a power adapter according to a sixth embodiment of the invention. The power adapter 100-6 of FIG. 6 differs from the power adapter 100-4 of FIG. 4 in that the power adapter 100-6 further comprises a third converter 60 electrically connected to the first converter 20, and the third converter 60 includes a buck circuit. The third converter 60 comprises a third output 62 for outputting a third voltage V3. Correspondingly, the voltage switching circuit 40 further comprises a third switching circuit (not shown) including a third switch, and having a first terminal for receiving the third voltage V3 and a second terminal electrically connected to the second terminal of the first switching circuit and the second terminal of the second switching circuit. Moreover, when the flyback converter (i.e., the second converter 30) operates, the power factor correction circuit 10 does not operate, and when the power factor correction circuit 10 operates, the flyback converter does not operate. In this embodiment, the first voltage V1 may be, for example, 40V or a higher voltage Hvo, the third voltage V3 may be, for example, 20V, and the second voltage V2 may be, for example, 5V, 9V, 12V or 15V.

Figure 7:
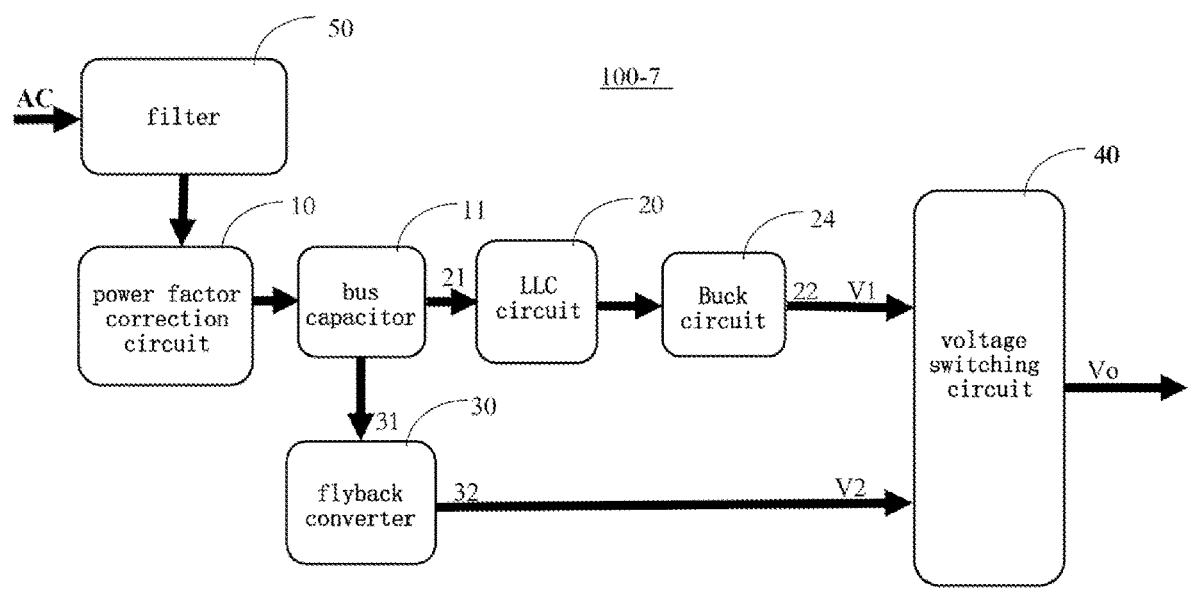
FIG. 7 is a diagram illustrating a power adapter according to a seventh embodiment of the invention.

FIG. 7 illustrates a power adapter according to a seventh embodiment of the invention. The power adapter 100-7 of FIG. 7 differs from the power adapter 100-4 of FIG. 4 in that the first converter 20 is composed of the LLC circuit and a buck circuit 24. Moreover, when the flyback converter (i.e., the second converter 30) operates, the power factor correction circuit 10 does not operate, and when the power factor correction circuit 10 operates, the flyback converter does not operate. In this embodiment, the first voltage V1 may be, for example, 20V, 40V or a higher voltage Hvo, and the second voltage V2 may be, for example, 5V, 9V, 12V or 15V.

Hereinafter, a structure of a voltage switching circuit 40 of FIG. 8 and its control for the output voltage Vo will be explicitly described by means of example.

As shown in FIG. 8, a first terminal E11 of a first switching circuit 41 of the voltage switching circuit 40 is electrically connected to the first output 22 of the first converter 20, for example, in the power adapter 100-1 of FIG. 1, and receives the first voltage V1 outputted from the first converter 20, and the first switching circuit 41 includes a first switch S1. A first terminal E21 of a second switching circuit 42 of the voltage switching circuit 40 is electrically connected to the second output 32 of the second converter 30, for example, in the power adapter 100-1 of FIG. 1, and receives the second voltage V2 outputted from the second converter 30, and the second switching circuit 42 includes a second switch S2. A second terminal E12 of the first switching circuit 41 is electrically connected to a second terminal E22 of the second switching circuit 42 to form a switching terminal for outputting the output voltage Vo. When the output voltage Vo is required to be switched from the first voltage V1 to the second voltage V2, the first switching circuit 41 is controlled to be turned off, and then the second switching circuit 42 may be controlled to be turned on such that the output voltage Vo is switched to the second voltage V2. Moreover, when a voltage at the first terminal E21 of the second switching circuit 42 is higher than a preset voltage, the second converter 30 is shut down or kept off.

In the invention, preferably, when the output voltage Vo is required to be switched from the first voltage V1 to the second voltage V2, the first switching circuit 41 is controlled to be turned off such that the output voltage Vo is controlled to be decreased to a temporary voltage less than the first voltage V1 and the second voltage V2, and then the second switching circuit 42 is controlled to be turned on such that the output voltage Vo is switched to the second voltage V2. It should be understood that when the output voltage Vo is required to be switched from the second voltage V2 to the first voltage V1, the second switching circuit 42 may be controlled to be turned off such that the output voltage Vo is controlled to be decreased to a voltage same as or different from the temporary voltage, in a similar manner as the switch of the output voltage Vo from the first voltage V1 to the second voltage V2. In another embodiment, when the output voltage Vo is required to be switched from the second voltage V2 to the first voltage V1, the output voltage Vo may not be decreased.

In one embodiment, the voltage at the first terminal E21 of the second switching circuit 42 is directly sensed to determine whether it is higher than the preset voltage or not.

Figure 10:
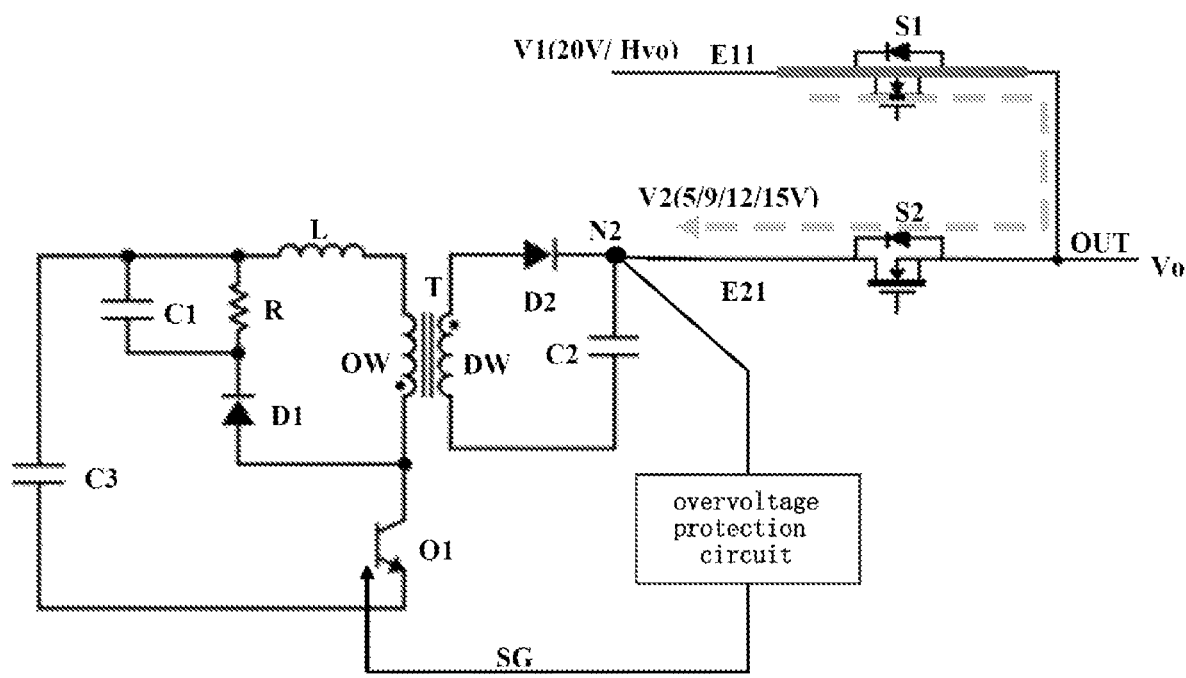
FIG. 10 is a diagram illustrating a first application of a power adapter according to the invention.

FIG. 10 illustrates a first application of a power adapter according to the invention. The first switch S1 and the second switch S2 of FIG. 9 constitute the voltage switching circuit of FIG. 8. Moreover, FIG. 10 does not illustrates the first converter electrically connected to the first terminal E11 of the first switching circuit 41, and only illustrates the second converter electrically connected to the first terminal E21 of the second switching circuit 42. In the embodiment of FIG. 10, the second converter may be, for example, a flyback converter including a transformer T. The transformer T comprises a primary winding OW and a secondary winding DW, and the secondary winding DW is electrically connected to the first terminal E21 of the second switching circuit. For example, a dotted terminal of the secondary winding DW is coupled to the first terminal E21 of the second switching circuit at a node N2 through a diode D2, and other terminal of the secondary winding DW is coupled to the node N2 through a capacitor C2. The capacitor C2 may be designed to withstand a voltage higher than a high voltage Hvo (for example but not limited to 40V). Further, an overvoltage protection circuit is also connected to the node N2, and the overvoltage protection circuit may send a control signal SG to shut down or keep off the flyback converter (i.e., the second converter) when detecting the voltage at the first terminal E21 of the second switching circuit to be higher than a preset voltage (for example but not limited to 60V). For example, the control signal SG may be sent to a control switch Q1 coupled to the dotted terminal of the transformer T. The primary winding OW of the transformer T further comprises components, such as an inductor L, a resistor R, capacitors C1 and C3, and a diode D1, at one side.

Figure 11:
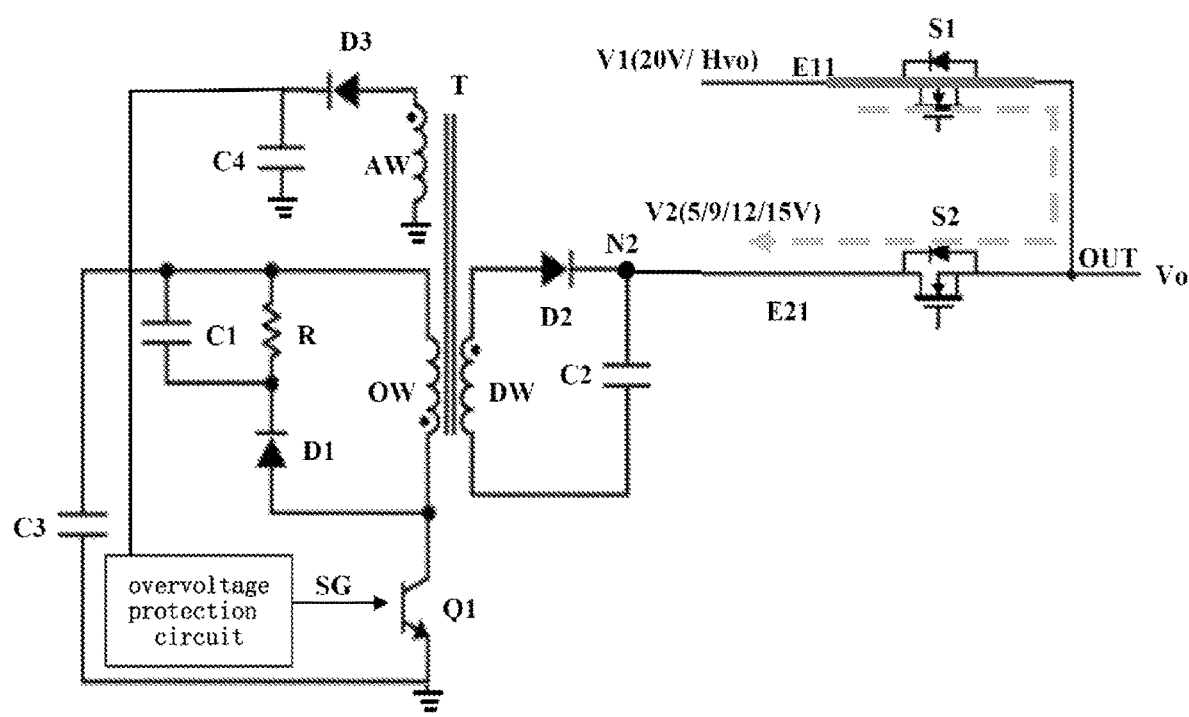
FIG. 11 is a diagram illustrating a second application of a power adapter according to the invention.

FIG. 11 illustrates a second application of a power adapter according to the invention, which differs from the embodiment of FIG. 10 in that the transformer T further comprises an auxiliary winding AW, and the overvoltage protection circuit determines whether the voltage at the first terminal E21 of the second switching circuit is higher than the preset voltage by detecting a voltage on the auxiliary winding AW. When the overvoltage protection circuit detects the voltage on the auxiliary winding AW to be higher than a certain voltage, and the voltage at the first terminal E21 of the second switching circuit calculated therefrom may be higher than the preset voltage (for example but not limited to 60V), the overvoltage protection circuit sends a control signal SG to shut down or keep off the flyback converter (i.e., the second converter). For example, the control signal SG may be sent to a control switch Q1. A dotted terminal of the auxiliary winding AW is grounded through a diode D3 and a capacitor C4, and other terminal of the auxiliary winding AW is directly grounded. It should be understood that the voltage at the first terminal E21 of the second switching circuit may be determined to be higher than the preset voltage in any other way, and the invention is not limited thereto.

Figure 12:
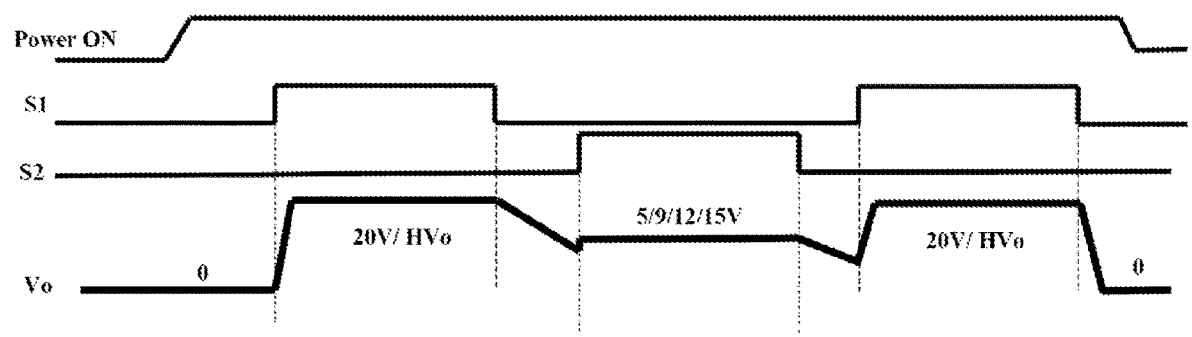
FIG. 12 is a schematic diagram illustrating voltage waveforms of the voltage switching circuit in the power adapter according to the invention.

FIG. 12 illustrates voltage waveforms of the voltage switching circuit in the power adapter according to the invention. Referring to FIGS. 1 and 8 along with FIG. 12, when the power adapter is power on, the first switch S1 and the second switch S2 are turned off. When an electric load is connected to the power adapter, and the power adapter is required to output an output voltage Vo of 20V or a higher voltage Hvo, the power factor correction (PFC) circuit and the first converter 20 starts to operate, and the first switch S1 is turned on. When the electric load is disconnected, the first switch S1 is turned off to discharge the output voltage Vo before connecting another electrical device requiring a voltage less than 20V. When the output voltage Vo is decreased to be slightly lower than the voltage required by the electrical device, the second switch S2 is turned on. When the electrical device is disconnected, the second switch S2 is turned off, and the output voltage Vo is discharged to 0V.

The present invention divides a range of the output voltage into a plurality of output voltages having different levels, such as a high voltage output portion and a low voltage output portion, through a combination of a plurality of converters, and meanwhile switches the operation state and operation mode of the plurality of converters through a voltage switching circuit, such that it is possible to satisfy both requirements for the regulating range of the output voltage and the efficiency.

Exemplary embodiments of the invention have been illustrated and described above. It should be understood that the invention is not limited to the disclosed embodiments. Instead, the invention intends to cover various modifications and equivalents included in the spirit and scope of the appended claims.

What is claimed is:

1. A voltage switching circuit, comprising:
  a first switching circuit comprising a first switch, and having a first terminal electrically connected to a first output terminal of a first converter and receiving a first voltage outputted from the first converter; and
  a second switching circuit comprising a second switch, and having a first terminal electrically connected to a second output terminal of a second converter and receiving a second voltage outputted from the second converter,
  wherein a second terminal of the first switching circuit is electrically connected to a second terminal of the second switching circuit to form a switching terminal for outputting an output voltage, and
  wherein when the output voltage is required to be switched from the first voltage to the second voltage, the first switching circuit is controlled to be turned off, and then the second switching circuit is controlled to be turned on such that the output voltage is switched to the second voltage, and
  wherein when a voltage at the first terminal of the second switching circuit is higher than a preset voltage, the second converter is shut down or kept off.

2. The voltage switching circuit according to claim 1, wherein when the output voltage is required to be switched from the first voltage to the second voltage, the first switching circuit is controlled to be turned off such that the output voltage is controlled to be decreased to a temporary voltage less than the first voltage and the second voltage, and then the second switching circuit is controlled to be turned on such that the output voltage is switched to the second voltage.

3. The voltage switching circuit according to claim 1, wherein the first switch and the second switch are semiconductor switching elements.

4. The voltage switching circuit according to claim 1, wherein the first voltage is higher than the second voltage.

5. The voltage switching circuit according to claim 1, wherein the first voltage is no less than 20V, and the second voltage is 5V, 9V, 12V or 15V.

6. The voltage switching circuit according to claim 1, wherein the voltage at the first terminal of the second switching circuit is directly sensed to determine whether it is higher than the preset voltage or not.

7. The voltage switching circuit according to claim 1, wherein the second converter is a flyback converter including a transformer, the transformer comprises a primary winding and a secondary winding, and the secondary winding is electrically connected to the first terminal of the second switching circuit.

8. The voltage switching circuit according to claim 7, wherein the transformer further comprises an auxiliary winding, and the voltage at the first terminal of the second switching circuit is determined to be higher than the preset voltage or not by detecting a voltage on the auxiliary winding.

9. The voltage switching circuit according to claim 1, wherein the first converter comprises an LLC circuit, a half-bridge circuit or a full bridge circuit.

10. The voltage switching circuit according to claim 1, wherein the first switch comprises a drain electrode serving as the first terminal of the first switching circuit and a source electrode serving as the second terminal of the first switching circuit, and
wherein the second switch comprises a drain electrode serving as the first terminal of the second switching circuit and a source electrode serving as the second terminal of the second switching circuit.

11. The voltage switching circuit according to claim 1, further comprising a third switch connected between a node, at which the first switch and the second switch are electrically connected to each other, and the switching terminal,
wherein the first switch comprises a source electrode serving as the first terminal of the first switching circuit and a drain electrode serving as the second terminal of the first switching circuit, and
wherein the second switch comprises a source electrode serving as the first terminal of the second switching circuit and a drain electrode serving as the second terminal of the second switching circuit.

12. A power adapter, comprising:
a power factor correction circuit comprising a bus capacitor;
a first converter comprising an input electrically connected to the bus capacitor and a first output for outputting a first voltage;
a second converter comprising an input electrically connected to the bus capacitor and a second output for outputting a second voltage; and
a voltage switching circuit comprising:
a first switching circuit including a first switch and having a first terminal for receiving the first voltage; and
a second switching circuit including a second switch and having a first terminal for receiving the second voltage,
wherein a second terminal of the first switching circuit is electrically connected to a second terminal of the second switching circuit to form a switching terminal for outputting an output voltage,
wherein when the output voltage is required to be switched from the first voltage to the second voltage, the first switching circuit is controlled to be turned off, and then the second switching circuit is controlled to be turned on such that the output voltage is switched to the second voltage, and
wherein when a voltage at the first terminal of the second switching circuit is higher than a preset voltage, the second converter is shut down or kept off.

13. The power adapter according to claim 12, further comprising a filter electrically connected to the power factor correction circuit.

14. The power adapter according to claim 12, further comprising a third converter electrically connected to the first converter and comprising a third output for outputting a third voltage,
wherein the voltage switching circuit further comprises a third switching circuit including a third switch, and having a first terminal for receiving the third voltage and a second terminal electrically connected to the second terminal of the first switching circuit and the second terminal of the second switching circuit.

15. The power adapter according to claim 14, wherein the third converter includes a buck circuit.

16. The power adapter according to claim 12, wherein the first converter further comprises a fourth output for outputting a fourth voltage, and
the voltage switching circuit further comprises a third switching circuit including a third switch, and having a first terminal for receiving the fourth voltage and a second terminal electrically connected to the second terminal of the first switching circuit and the second terminal of the second switching circuit.

17. The power adapter according to claim 12, wherein the second converter is a flyback converter.

18. The power adapter according to claim 12, wherein the first converter includes an LLC circuit.

19. The power adapter according to claim 18, wherein the first converter is composed of the LLC circuit and a buck circuit.

20. The power adapter according to claim 12, wherein the first converter includes a half-bridge circuit or a full bridge circuit.

21. The power adapter according to claim 12, wherein when the output voltage is required to be switched from the first voltage to the second voltage, the first switching circuit is controlled to be turned off such that the output voltage is controlled to be decreased to a temporary voltage less than the first voltage and the second voltage, and then the second switching circuit is controlled to be turned on such that the output voltage is switched to the second voltage.

22. The power adapter according to claim 12, wherein the first switch comprises a drain electrode serving as the first terminal of the first switching circuit and a source electrode serving as the second terminal of the first switching circuit, and
wherein the second switch comprises a drain electrode serving as the first terminal of the second switching circuit and a source electrode serving as the second terminal of the second switching circuit.

23. The power adapter according to claim 12, further comprising a third switch connected between a node, at which the first switch and the second switch are electrically connected to each other, and the switching terminal,
wherein the first switch comprises a source electrode serving as the first terminal of the first switching circuit and a drain electrode serving as the second terminal of the first switching circuit, and
wherein the second switch comprises a source electrode serving as the first terminal of the second switching circuit and a drain electrode serving as the second terminal of the second switching circuit.

* * * * *